United States Patent [19]

Namazue

[11] Patent Number: 4,858,453
[45] Date of Patent: Aug. 22, 1989

[54] CAR ANTI-THEFT DEVICE

[75] Inventor: Hirotoshi Namazue, Fujisawa, Japan

[73] Assignee: Kokusan Kinzoku Kogyo Kabushiki Kaisha, Tokyo, Japan

[21] Appl. No.: 228,879

[22] Filed: Aug. 5, 1988

Related U.S. Application Data

[63] Continuation of Ser. No. 939,803, Dec. 9, 1986, abandoned.

[51] Int. Cl.$^4$ .............................................. E05B 49/00
[52] U.S. Cl. ........................................ 70/278; 70/252; 70/408; 250/239
[58] Field of Search ................... 70/278, 252, 408; 250/216, 221, 239, 566, 578

[56] References Cited

U.S. PATENT DOCUMENTS

| | | | |
|---|---|---|---|
| 1,685,128 | 9/1928 | Hershey | 70/252 |
| 3,569,930 | 3/1971 | Hirama | 70/252 X |
| 3,575,023 | 4/1971 | Shimizu | 70/252 |
| 3,628,033 | 12/1971 | Taillens | 250/566 |
| 3,739,610 | 6/1973 | Kuroki | 70/252 |
| 3,797,936 | 3/1974 | Dimitriadis | 70/278 |
| 4,051,365 | 9/1977 | Fukuyama et al. | 250/239 |
| 4,090,175 | 5/1978 | Hart | 70/278 |
| 4,148,092 | 4/1979 | Martin | 70/278 |
| 4,286,305 | 8/1981 | Pilat et al. | 70/278 |
| 4,318,288 | 3/1982 | Rifat | 70/278 |
| 4,332,306 | 6/1982 | Turatti | 70/252 X |
| 4,399,673 | 8/1983 | Gotanda | 70/278 |
| 4,427,967 | 1/1984 | Maiocco | 70/252 X |
| 4,452,059 | 6/1984 | Sornes | 70/278 |
| 4,507,944 | 4/1985 | Widen et al. | 70/278 |
| 4,534,194 | 8/1985 | Aydin | 70/278 |
| 4,663,952 | 5/1987 | Gelhard | 70/278 |
| 4,734,693 | 3/1988 | Dluhosch et al. | 70/278 X |

Primary Examiner—Gary L. Smith
Assistant Examiner—Suzanne L. Dino
Attorney, Agent, or Firm—Fleit, Jacobson, Cohn, Price, Holman & Stern

[57] ABSTRACT

A combination of a mechanical key of the reversible type and a steering shaft for locking and unlocking a key cylinder including a stationary housing and a rotatable rotor mounted therein. For reducing car thefts, the key is provided with electrical contacts arranged on opposite surfaces. An illuminator control circuit is mounted on the key and is adapted for delivery of a code signal corresponding to a specifically preset code signal upon energization of the electrical contacts. The key is provided with a pair of illuminator elements in lateral position. The lock cylinder is formed in the key slot and is adapted for establishing an electrical contact with either of the electrical contacts on the key.

1 Claim, 4 Drawing Sheets

CAR ANTI-THEFT DEVICE

This application is a continuation application under 37 C.F.R. 1.62 of prior application Ser. No. 939,803, filed on Dec. 9, 1986, entitled CAR ANTI-THEFT DEVICE, and now abandoned.

BACKGROUND OF THE INVENTION

1. Field of the Invention

This invention concerns a novel car anti-theft device comprising a manually operable key fitted with illuminatable element means and a steering lock fitted with light sensitive element means.

2. Prior Art

Conventional car keys are identified by their specific shapes and numbers of key and groove serrations, respectively.

Therefore, the usable range of the keys must be highly limited and thus, picking possibilities are rather frequent.

In recent decades, however, improvements have been proposed to provide additional discriminating means in or on the key proper. As an example thereof, U.S. Pat. No. 4,148,372 may be referred to.

In this prior art device, a manually operable key is inserted into the steering lock and turned to the START-position. This is the first condition for starting the engine. An electric resistant pellet has been embedded in the material of the key. If the resistance value of the pellet is equal to a preset value specifically allocated to the car, it is adjudged that a correct manual key has been selected and used. This constitutes a second condition for starting the engine.

It has been found that the reliance on electric resistance is rather limitative for the identification of engine keys.

Further, the electric resistance will vary with variation of ambient temperature and humidity.

BRIEF DESCRIPTION OF THE INVENTION

It is, therefore, an object of the present invention to provide an improved car anti-theft device by reliance upon more reliable means than an electric resistor.

It is still a further object to provide an improved car anti-theft device which is not influenced by ambient temperature and moisture fluctuations.

This and further objects, features and advantages may be attained by providing a highly improved car anti-theft device which comprises:
- a manually operable, vehicle and engine operation controllable key piece which further comprises:
- a pair of electrodes mounted thereon;
- an illumination circuit electrically connected with said electrode pair and adapted for delivery of a specifically preset code signal upon energization of said electrode pair, and illumination element means which are caused to illuminate upon reception of said code signal;
- a steering lock having a key-reception opening adapted for receiving said key piece, further comprising:
- a pair of electrical terminals mounted a defining wall of said opening and electrically connectable with said electrodes for conveying voltage coming from said key piece side, and light-receiving element means coming from the side of said illumination element means; and lightreception circuitry adapted for adjudging a coincidence between a signal from said light reception element means with said preset code signal and adapted for starting an engine starter and/or making an engine controller, into operable condition.

DETAILED DESCRIPTION OF THE PREFERRED EMBODIMENTS

In the following, preferred embodiments of the present invention will now be described more in detail with reference to the accompanying drawings.

Figure 1:
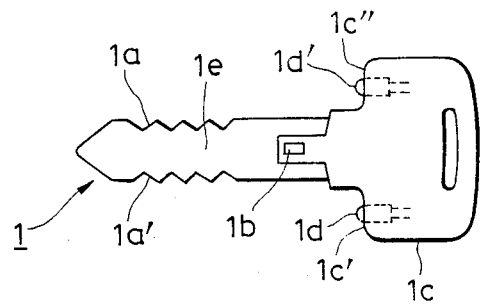
FIG. 1 is a side view of a reversible type engine key providing improvements in accordance with the present invention.

In FIG. 1, a manually operable engine key of the up-and-down reversible type is shown generally at 1 in its side elevation, which has two series of symmetrical key serrations 1a and 1a' formed on both side edges of the key proper 1e.

Figure 3:
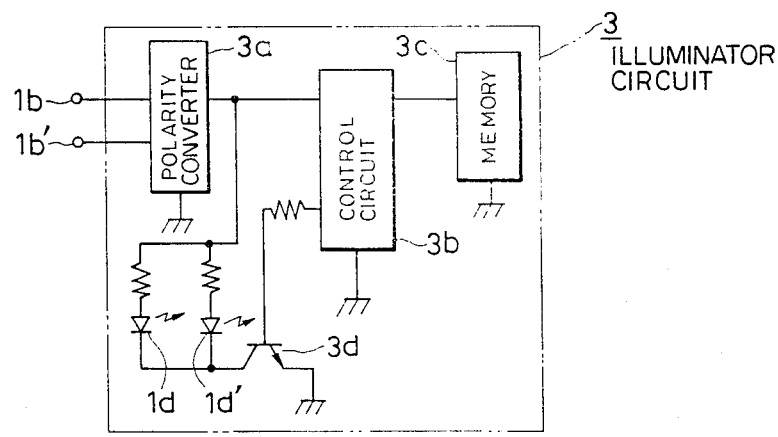
FIG. 3 is an illumination circuit molded within the engine key.

At the root portion of the ignition key 1, a pair of oppositely positioned electrodes 1b and 1b' are provided on both surfaces of said key proper or plate, although the latter electrode 1b' is not illustrated in FIG. 1. However, the latter is schematically shown in FIG. 3. Naturally, these electrodes or contact 1b and 1b' are electrically insulated from the body portion 1e of key 1 which is made of a metal, preferably steel.

Symbol 1c represents a unitary grip section made preferably of synthetic resin material and cast integrally thereon and covering the front and rear root surfaces of the key proper 1e.

A pair of illuminatable diode elements 1d and 1d' are provided at the two shoulder portions 1c' and 1c" of grip section 1c in a substantially embedded manner and direct their illuminating lights toward the tip end of key 1, when either of them is energized. An illuminator circuit shown generally with 3 in FIG. 3 which includes said diode pair 1d; 1d', is cast within the material of said cast-on resin section 1c.

Figure 2:
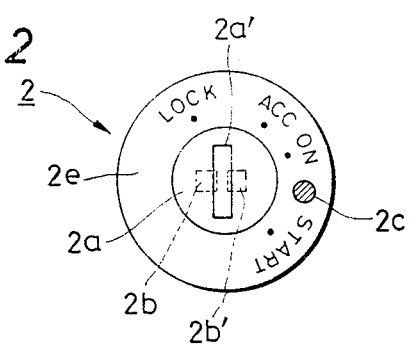
FIG. 2 is a front view of a steering lock assembly comprising a stationary housing and a rotor mounted rotatably therein.

In FIG. 2, a steering lock 2 is shown in its front view having a rotor 2a formed with a conventional key slot or opening 2a', said blade portion 1e of the key 1 being naturally able to be inserted thereinto and redrawn out. An opposite pair of terminals 2b and 2b' are provided in the key cylinder 2a of steering lock 2 and in a partially exposed manner into the key slot 2a'.

When the key blade 1e has been inserted into the key slot 2a fully in position, specifically arranged conventional tumblers (not shown) are pressed laterally by contact with serrative projections 1a or 1a' formed on the key edge, and the rotor 2a becomes rotatable by turning the key 1 in the clockwise or counter clockwise direction, as the case may be. In addition, said terminal 2b or 2b' is brought into electrical connection with corresponding electrode 1b or 1b' of key 1, respectively.

In this way, current may be supplied to illuminator circuit 3 through either of these established electrical connections, as will be more fully disclosed hereinafter.

At the ignition-ON position of steering lock 2, there is provided a light reception element 2c which is so designed and arranged to receive light beams issued from illuminator element 1d or 1d', if either one of the latter has been energized.

Figure 4:
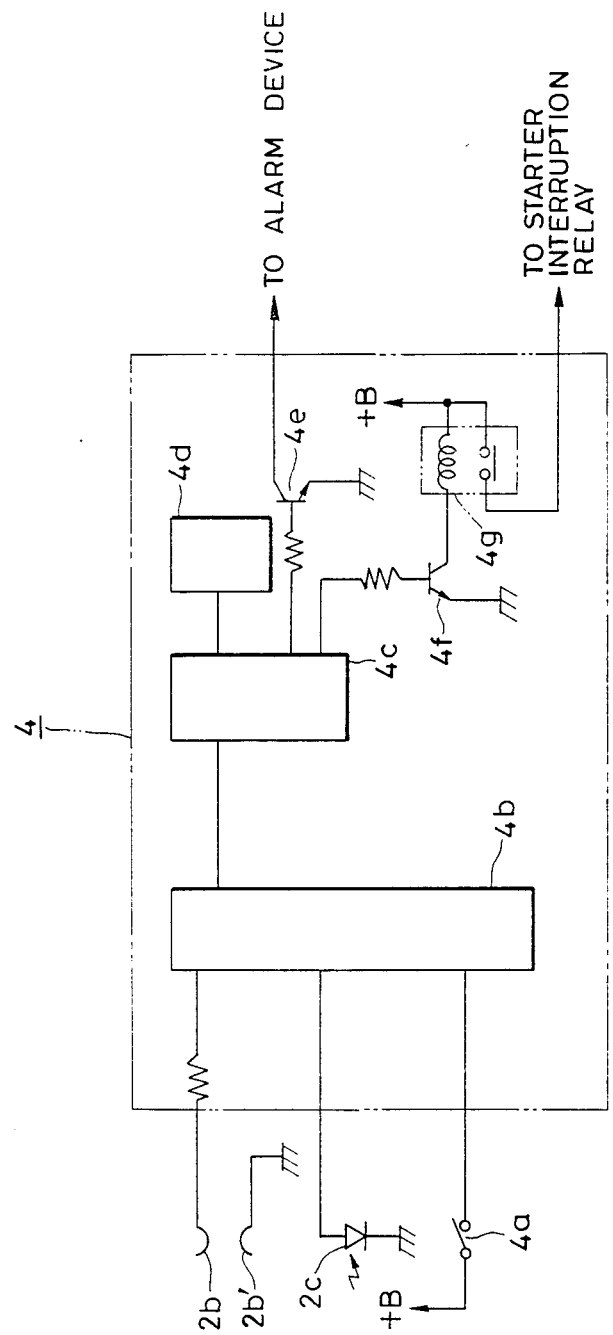
FIG. 4 is a light reception circuit mounted at the steering lock housing.

In FIG. 4, numeral 4 represents a light reception circuit to which said element 2c is electrically connected, as shown. This arrangement serves to make a discrimination of a signal from light reception element 2c whether it is originated from the vehicle key or not.

Next, referring back to FIG. 3, the illuminator circuit 3 molded in the resin-made grip section 1c will be described hereinbelow.

In this drawing, said electrodes or contacts 1b and 1b' and illuminator diodes 1d and 1d' are also shown.

3a represents a polarity conversion circuit which is preferably a diode rectifier and electrically connected with said electrodes 1b and 1b'. It should be remembered that the key 1 is the reversible type, since upper and lower serrations 1a and 1a' are made in the opposite shape to each other, as seen from FIG. 1. Although a 12-volt current will be supplied when the electrode 1b or 1b' is brought into electrical connection with the terminal 2b or 2b' upon insertion of the key 1 into key slot 2a', as was already described substantially hereinbefore, the polarity of the current may be either plus or minus, depending upon key insertion attitude "up" or "down". By provision of polarity converter 3a, a supply of reverse polarity current to illuminator circuit 3 may be positively prevented.

Control circuit 3b is electrically connected with polarity conversion circuit 3a, the former being adapted for on-off control of a transistor 3d by a signal fed to the control circuit 4c to be described; and for feeding to the latter through closure of ignition switch 4a.

The control circuit 4c is so designed and arranged that when ignition switch 4a has been closed a voltage is supplied to said terminals 2b; 2b' and comparison is made if there is a coincidence between the signal fed from illuminator element 2c and the preset signal stored at memory circuit 4d and further, if there be such coincidence as mentioned above the transistor 4f is turned on, while, if there be no coincidence, another transistor 4e is caused to turn on. Therefore, when repeating again, the memory 4d has stored the code specifically selected out for the car under consideration.

Symbol 4g represents a relay which becomes conductive if the transistor 4f is on, thus its movable contact being caused to close.

As shown, transistor 4e is connected with an alarm which is preferably a buzzer.

Further, movable contact of relay 4g is electrically contact to a starter interruption relay, not specifically illustrated. In the case of an automatic clutch vehicle, the electric connection under consideration is made to such a relay, although not specifically illustrated, which is so designed and arranged that the starter is caused to operate when the shift lever, not shown, is positioned, either at the parking or neutral position.

Figure 5:
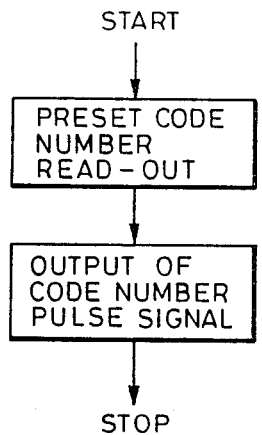
FIGS. 5 and 6 are flow charts to be used for the illustration of the anti-theft device according to this invention.
Figure 6:
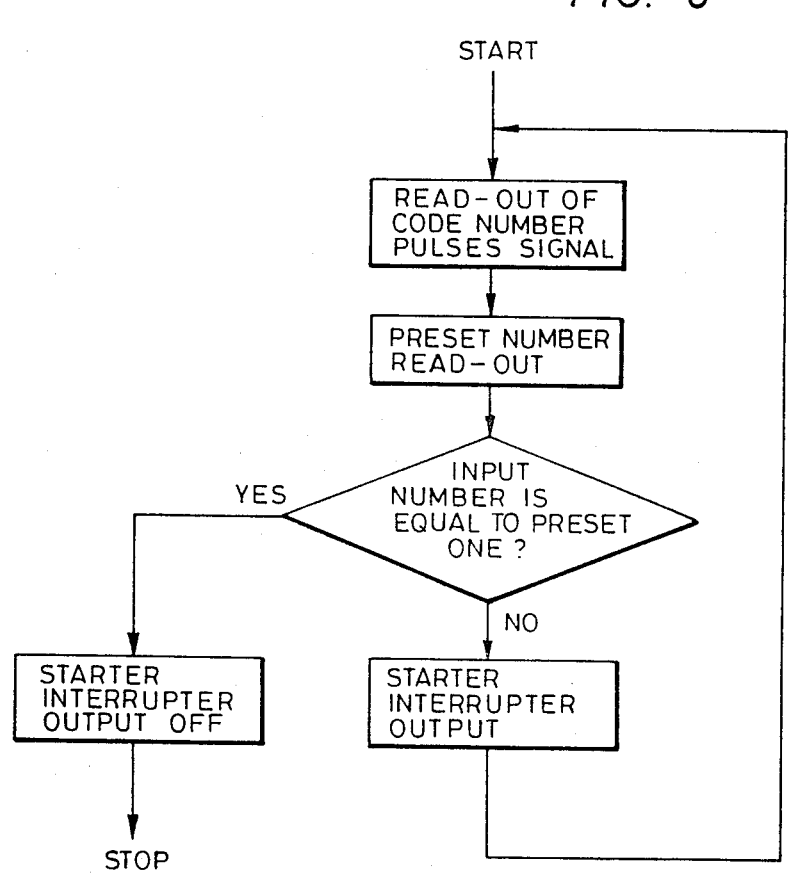

Finally, the operational mode will be set forth hereinbelow with reference to flow charts shown in FIGS. 5 and 6.

Now assuming that a correct ignition key specifically attributed to a car under consideration, as at 1, which represents inventive improvements so far shown and described, has been selected out and inserted into the key insertion slot 2a' of steering lock rotor 2a in position, either electrode 1b or 1b' is brought into conductive engagement with terminal 2b or 2b', respectively. Then, the rotor 2a is rotated with the inserted engine key clockwise to ON-position, ignition switch 4a is caused to close and voltage energy is supplied to terminal 2b or 2b' from current source. Thus, illuminator circuit 3 is caused to operate in the aforementioned way and control circuit 3b reads out the code from storage 3c, and a pulse signal is fed to transistor 3d. In this way, the transistor 3d is caused to on-off operate so as to make on-off operation of illumination diode 1d in accordance with said pulse signal.

Successive light beams will be delivered from said illumination diode 1d, 1d' to light reception element 2c which delivers in turn a corresponding light pulse signal which is then fed through input/output circuit 4b to control circuit 4c. The latter circuit 4c reads out this pulse signal as well as the preset signal from memory circuit 4d.

And, therefore, a comparison is made between the input signal and the preset signal and a comparison job between these both signals will be made. When there is a coincidence, in this sense, an output will be fed to transistor 4f for turning the latter on.

Current is, therefore, fed to relay 4g and thus, its movable contact is closed and an output is fed to the starter interruption relay for operating the starter motor, not shown.

On the contrary, if a false or incorrect engine key is used, the steering lock rotor 2a will be rotated. However, in this case, the key is not fitted with an illumination diode and thus, the element 2c receives no light and no further action will be made at light reception circuit 4.

By rotation of the rotor 2a with use of the false key, current will also be fed to the key blade 1e, and illumination element 1d will be caused to make on-off operations, the mode of which is, however, different from the read-out signal from the memory 4d. Thus, control circuit 4c determines that there is a lack of coincidence and an output will be fed to another transistor 4e. By this operation, the alarm will be operated so as to give notice to the driver or other responsive person of the possibility of a key misuse or a possible picking of the lock.

In, in the foregoing embodiment description, the engine starting has been described only as an explanatory example. Any person skilled in the art will easily think of similar applications as with a car trunk, openable car roof or the like appliances.

Figure 7:
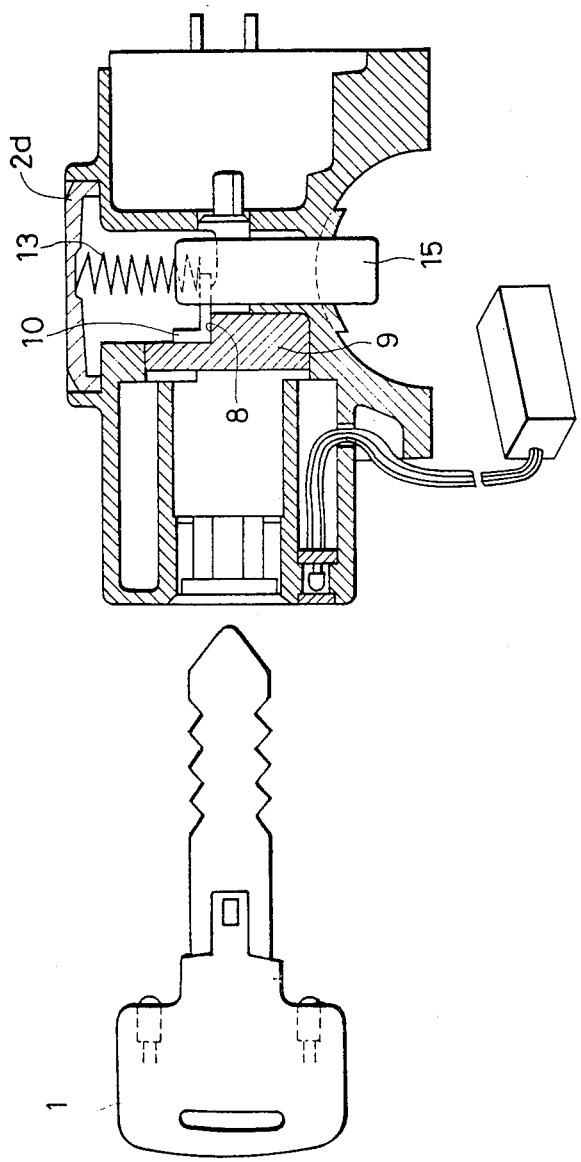
FIG. 7 is a schematic sectional view of a shaftlocking device fitted with the steering lock assembly.

Further, with reference to FIG. 7, the locking operation per se will be described only briefly, taking the case of steering shaft locking and unlocking operations.

The forward end of the rotor 2a of lock 2 is operatively connected coaxially with a rotator 9 which is formed rigidly with a rotary cam, preferably a sector cam 8, kept in pressure contact with a hanger 10. This hanger 10 supports a conventional steering shaft locking bolt 15 which can slide up-and-down as in FIG. 7. The lowermost end of this locking bolt is brought into engagement with a recess, not shown, of the steering shaft, not shown. FIG. 7 represents such a shaft-locking state. There is an urging spring 13 provided between a stationary cap member 2d and said hanger 10, for urging the locking bolt towards its locking direction.

With operational rotation of the rotor 2a of lock 2, upon proper insertion and rotation of the key 1 in the aforementioned way, the rotator and hanger are caused to move upwardly against the action of the urging spring 13, so as to raise or recede the locking bolt 15 from its shaft locking position to its unlocking position.

When the key is turned in the opposite direction, the locking bolt 15 is caused to advance downwards under the action of spring 13 until the tip end of bolt 15 has been brought into engagement with the recess of the steering shaft for locking the latter.

As the light medium for signal transmission usable in this invention, infrared light may most preferably be employed.

Although the present invention has been described in the foregoing with particular reference to a preferred embodiment, it should be understood that this is merely illustrative and not restrictive, and any change and modification may be effected within the spirit and scope of the present invention as recited in the appended claims.

The embodiments of the invention in which an exclusive property or privilege is claimed are as follows:

1. Anti-theft device for automotive vehicles, comprising:

a key unit having a body including identical opposite side edge serrations, a pair of electrical contacts mounted opposite to each other on two side surfaces of said body and insulated from said body, an illuminator control circuit mounted on said body for delivery of a signal corresponding to a specifically preset code signal upon energization of either of said electrical contacts, said illuminator control circuit including a polarity converter electrically connected to said electrical contacts for preventing a supply of a reverse polarity current, a control circuit electrically connected to said polarity converter and a memory connected to said control circuit for a correct polarity energization of said control circuit to transmit said preset code signal stored in said memory, a pair of illuminator elements arranged on said key unit in a laterally opposite position to each other and electrically connected to said illuminator control circuit for transmission of said preset code signal, and a cylinder lock unit mechanically movable by engagement with said edge serrations when said side edge serrations are arranged in a predetermined pattern, said cylinder lock unit having a key-reception slot, an opposite pair of terminals projecting partially into said slot and each establishing an electrical contact with either of said electrical contacts, respectively, when said key unit has been inserted into said slot and energizing said illuminator control circuit when said cylinder lock unit has been moved to an ON-position by said key unit, a light-reception element mounted on said lock unit for reception of light from either of said illuminator elements, comparator means for adjudging a coincidence between a signal received by said light-reception elements from one of said illuminator elements and a predetermined signal, first means energized by a coincidence of signals by said comparator means for making a vehicle controller operate, second means energized by a lack of coincidence of said signals by said comparator means for activing an alarm.

* * * * *